United States Patent
Lehmann

(10) Patent No.: US 11,708,471 B2
(45) Date of Patent: Jul. 25, 2023

(54) MODIFIED PLASTIC SURFACES WITH PERFLUOROPOLYMERS AND METHOD FOR PRODUCING SAME

(71) Applicant: LEIBNIZ-INSTITUT FÜR POLYMERFORSCHUNG DRESDEN E.V., Dresden (DE)

(72) Inventor: Dieter Lehmann, Dresden (DE)

(73) Assignee: LEIBNIZ-INSTITUT FÜR POLYMERFORSCHUNG DRESDEN E.V., Dresden (DE)

( * ) Notice: Subject to any disclaimer, the term of this patent is extended or adjusted under 35 U.S.C. 154(b) by 686 days.

(21) Appl. No.: 16/625,162

(22) PCT Filed: Jun. 14, 2018

(86) PCT No.: PCT/EP2018/065807
§ 371 (c)(1),
(2) Date: Dec. 20, 2019

(87) PCT Pub. No.: WO2018/234150
PCT Pub. Date: Dec. 27, 2018

(65) Prior Publication Data
US 2021/0284814 A1    Sep. 16, 2021

(30) Foreign Application Priority Data

Jun. 23, 2017 (DE) .......................... 102017210657.3

(51) Int. Cl.
C08J 7/12       (2006.01)
C08J 7/046      (2020.01)
C08J 7/04       (2020.01)
C08J 3/12       (2006.01)
C09D 5/03       (2006.01)

(52) U.S. Cl.
CPC .................. C08J 7/126 (2013.01); C08J 3/12 (2013.01); C08J 7/046 (2020.01); C08J 7/0427 (2020.01); C09D 5/031 (2013.01); C08J 2375/04 (2013.01); C08J 2377/00 (2013.01); C08J 2427/18 (2013.01)

(58) Field of Classification Search
CPC ........................... C08J 2377/00; C08J 2427/18
See application file for complete search history.

(56) References Cited

U.S. PATENT DOCUMENTS 5,576,106 A    11/1996  Kerbow et al.
2007/0244212 A1*  10/2007  Lehmann ................ C08L 23/02
                                                    522/120

FOREIGN PATENT DOCUMENTS

| DE | 198 23 609 | 12/1999 |
| DE | 100 42 566 | 3/2002 |
| DE | 103 51 812 A1 | 6/2005 |
| DE | 103 51 812 B4 | 4/2006 |
| DE | 10 2014 225 672 | 6/2016 |
| WO | 02/16483 | 2/2002 |
| WO | 2016/091938 | 6/2016 |

OTHER PUBLICATIONS

K. Lunkwitz et al., "Modification of perfluorinated polymers by high-energy irradiation", Journal of Fluorine Chemistry 125 (2004), ., pp. 863-873.
A. Heger et al., "Technologic der Strahlenchemie von Polymeren.", Akademie-Verlag Berlin 1990, pp. 207-252.
Ferse et al., "Modifiziertes Feinpulver aus Polytetrafluorethylen.", Plaste u. Kautschuk, 29 (1982), 458; DD 146 716, ., pp. 458-465.
Lappan et al., "PTFE Micropowder Functionalized with Carboxylic Acid Groups.", Macromol. Mater. Eng. 2008, 293, ., pp. 538-542.
D. Fischer et al., "FTi.r. spectroscopy on electron irradiated polytetrafluoroethylene.", Polymer 39 (1998)3, pp. 573-582.
Official Communication issued in International Bureau of WIPO Patent Application No. PCT/EP2018/065807, dated Sep. 10, 2018, along with an English translation thereof.

* cited by examiner

*Primary Examiner* — Andrew S Rosenthal
(74) *Attorney, Agent, or Firm* — Greenblum & Bernstein, P.L.C.

(57) ABSTRACT

Modified plastic surfaces with perfluoropolymers are provided, whereby plastic surfaces that are intended for use under tribological conditions have substantially improved assembly properties and/or sliding friction properties and exhibit a very low degree of wear. Accordingly, modified plastic surfaces with perfluoropolymers are provided in which, after a reactive conversion under mechanical stress at room temperature, at least the reactive —NH groups and/or —OH groups present at the surface of plastics are present in a chemically covalently coupled manner with the perfluoropolymer carboxylic acid halide present at least in the surface-proximate region of modified perfluoropolymer (micro)powders and/or with the grafted (meth)acrylic acid halide present via perfluoropolymer (peroxy) radicals of the perfluoropolymer (micro)powders and/or (meth)acrylic acid that has been modified into (meth)acrylic acid halide before the reactive conversion.

24 Claims, No Drawings

MODIFIED PLASTIC SURFACES WITH PERFLUOROPOLYMERS AND METHOD FOR PRODUCING SAME

The invention concerns the field of chemistry and relates to modified plastic surfaces with perfluoropolymers, which surfaces have improved assembly properties and/or sliding friction properties for use under tribological conditions and exhibit reduced wear and which can in particular be used in mechanical engineering in general and in the specific fields of sealing technology/dynamic sealing systems and automotive engineering, and relates to a method for producing a modification of this type.

Plastics denotes materials which are primarily composed of macromolecules (Wikipedia, German-language keyword "Kunststoffe").

A polymer is a chemical substance which is composed of macromolecules (Wikipedia, German-language keyword "Polymer").

It is known that polyfluoroalkyl polymers, such as PTFE and/or PFA for example, are radiation-chemically degraded when exposed to high-energy radiation such as electron beams and/or gamma rays [K. Lunkwitz et al., Journal of Fluorine Chemistry 125 (2004) 863-873].

"When PTFE is irradiated in the presence of oxygen, peroxy and alkoxy radicals are formed from the perfluoroalkyl radicals which initially form . . . .

Via the intermediate stage of alkoxy radical formation, the terminal perfluoroalkyl radical is degraded stepwise, with chain reduction taking place and carbonyl difluoride being formed . . . .

By contrast, perfluoroalkanecarboxylic acid fluorides and terminal perfluoroalkyl radicals are formed from the pendant alkoxy radicals . . . .

Unsintered and unpressed PTFE emulsion and suspension polymerizates have a fibrous, felt-like character. A transfer of the anti-adhesive and sliding properties of the PTFE, for example, to other media by an embedding in aqueous or organic dispersions, polymers, dyes, lacquers, resins, or lubricants is not possible because this PTFE cannot be homogenized and instead tends to form clumps or agglomerates, floats on the surface, or settles out.

Through the application of high-energy radiation at an energy dose of approximately 100 kGy, a free-flowing fine powder is obtained from the fibrous, felt-like polymerizates as a result of a partial degradation of the polymer chains. This powder contains even looser agglomerates which can easily be disaggregated into primary particles with a particle diameter of <5 µm. Where irradiation takes place in the presence of reactants, functional groups are incorporated into the polymer. If the irradiation takes place in air, then . . . (and by the means of subsequent hydrolysis of the —COF groups due to humidity) carboxyl groups are obtained . . . . The positive properties of the PTFE, such as the excellent sliding, separation and dry lubricant properties as well as the high chemical and thermal stability, are preserved . . . " [A. Heger et al., Technologie der Strahlenchemie an Polymeren, Akademie-Verlag Berlin 1990].

In many cases, the incompatibility with other materials has a disadvantageous effect when perfluoroalkyl polymers are irradiated in this manner.

A modification of the PTFE can also be achieved by a chemical activation of PTFE using the known methods involving (1.) sodium amide in liquid ammonia and (2.) alkali alkyl compounds and alkali aromatic compounds in aprotic inert solvents. Improved interfacial interactions can be achieved via these modifications.

The products of the PTFE degradation following an irradiation are used in diverse fields of application, including as an additive to plastics for the purpose of obtaining sliding or anti-adhesive properties, for example. The fine powder substances are present more or less finely dispersed as filler component in a matrix [Ferse et al., Plaste u. Kautschuk, 29 (1982), 458; DD 146 716].

Through the use of PTFE fine powder, an improvement in the properties compared to the commercial fluorocarbon-free additives can be achieved.

According to U.S. Pat. No. 5,576,106 B 1, grafted fluorine-containing plastics are known which are composed of fluorine-containing plastic particles such as ETFE, which does not belong to the perfluoropolymers, on the surface of which particles a non-homopolymerized ethylenically unsaturated compound is grafted. The non-homopolymerized ethylenically unsaturated compounds can thereby be acids, esters or anhydrides.

From DE 198 23 609 A1, the production of compounds composed of polyamide and perfluoroalkyl substance(s) and mixtures of these compounds with other polymer substances is known, as well as a method for the production thereof and use thereof, wherein modified perfluoroalkyl substance(s) with polyamide compound(s) are homogenized in melt via a reactive conversion.

DE 103 51 812 A1 describes "modified perfluoro plastics composed of perfluoropolymers modified in a radiation-chemical and/or plasma-chemical manner with exposure to oxygen, the surface of which plastics simultaneously comprises —COOH groups and/or —COF groups and reactive perfluoroalkyl (peroxy) radical centers, wherein other low-molecular and/or oligomeric and/or polymeric substances and/or olefinically unsaturated monomers and/or olefinically unsaturated oligomers and/or olefinically unsaturated polymers or mixtures thereof are coupled via some or all groups and/or to some or all centers by subsequent reactions."

DE 10 2014 225 672 A1 describes a "method for producing modified PTFE solid lubricants, in which method PTFE micropowders with at least functional and/or thermally activatable groups are mixed with at least one low-molecular and/or oligomeric compound having at least one reactive or thermally reactivatable and/or catalyst-activatable —NH group at a ratio of 100 g PTFE micropowder to <100 mmol low-molecular and/or oligomeric compound, and are reactively converted under thermal and mechanical stress or under mechanical stress."

This coupling reaction of perfluoropolymers or perfluoroalkyl substances, specifically PTFE, with low-molecular and/or oligomeric and/or polymeric compounds with —NH groups through a reactive conversion with the functional —COOH groups and/or —COF groups that originate from a radiation-chemical and/or plasma-chemical modification and/or from the polymerization process, takes place either in melt, in which the modified perfluoropolymer is reactively converted in melt with compounds containing —NH groups, or in a perfluoropolymer solid powder extrusion, in which the perfluoropolymer as a powder is reactively converted with compounds containing —NH groups.

Furthermore, plasma polymerization is known as a method for the surface modification of substrates, in which method perfluoro layers are also created directly on the substrate surface, for example.

"Plasma polymerization is a special plasma-activated variant of chemical vapor deposition (PE-CVD).

In plasma polymerization, vaporous organic precursor compounds (precursor monomers) in the process chamber are first activated by a plasma. Ionized molecules are created by the activation, and initial molecular fragments in the form of clusters or chains already form in the gas phase. The subsequent condensation of these fragments on the substrate surface then, under the effects of substrate temperature and electron and ion bombardment, causes the polymerization and thus the formation of a closed layer.

The structure of the resulting "plasma polymers" is comparable to highly crosslinked thermosets, as they form a covalent network which is to a great extent statistical. The deposition of chain polymers in mono- or polycrystalline form is therefore not possible through plasma polymerization." [wikipedia.org/wiki/Plasmapolymerisation].

From DE 100 42 566 A1, a method for modifying plastic surfaces is known, in which method one or more modifier substance(s) is fully or partially brought into contact with the surface of the shaped plastic during or immediately after or after a shaping process, and in which the temperature of the plastic surface is at least the onset temperature of the reaction peak on the DSC curve, wherein substances that enter into a reaction with the surface of the shaped plastic and/or penetrate into the surface due to interdiffusion and/or fuse onto the surface are used as modifier substance(s).

Polyamide, polyester, polycarbonate, TPU, and PVC were thereby surface-modified as plastics, wherein only the conversion of functional groups in substitution reactions was stated as reactions for the modification, which also include the reactions of carbonyl compounds. Furthermore, the examples only describe surface modification during the injection molding as a basis for the method of "interface-reactive injection molding."

In one specific method from DE 100 42 566 A1, surfaces are passivated for the "production of movable parts from identical materials . . . . Following the production of a plastic preform with a modification of the surface for passivation by means of modifier substances which are composed of compounds having at least one reactive group, wherein preferably perfluorinated and/or fluorine-containing and/or silicon-containing and/or paraffinic, low-molecular and/or oligomeric and/or polymeric compounds or mixtures thereof having at least one functionality are used, one or more additional components can be injected thereagainst, thereon or thereinto. The functionality is used to directly couple a portion of the modifier substance at the surface, under modification and/or a reaction with itself to form thin branched and/or crosslinked films, which films then react with the polymer of the melt surface via a chemical coupling of the residual functionalities and modify the surface . . . . For sufficient separation in the interface between the components for the production of movable parts in assembly injection molding . . . ."

For this purpose, perfluoroheptanoic anhydride is used for the surface modification/passivation of PA6 in the injection molding process in Example 15.

"In surface technology, passivation is understood as meaning the spontaneous creation or deliberate production of a protective layer on a metallic material, which layer prevents or markedly retards the corrosion of the base material." [https://de.wikipedia.org/wiki/Passivierung].

It is also known that carbonyl fluoride groups generated during the irradiation process with exposure to oxygen hydrolyze into the significantly less reactive carboxylic acids due to the influence of humidity, primarily in the surface-proximate region of the perfluoropolymer particles. Carboxylic acids only react with polyamides, for example, in melt contact during the reactive extrusion under shearing, as is known from DE 198 23 609 A1. Residual carbonyl fluoride groups that are not accessible to small water molecules due to the sterically shielded position in the interior of the perfluoropolymer particles are therefore preserved; that is, they are available for coupling reactions at most under extreme shearing conditions such as in the reactive extrusion.

The hydrolysis behavior of radiation-chemically modified PTFE was examined by D. Fischer et al. [D. Fischer et al., Polymer 39 (1998)3, 573-582]. Since moisture is adsorbed in PTFE despite hydrophobia, the hydrolysis of the formed carbonyl fluoride groups already emerges during the irradiation, with hydrofluoric acid thereby being released, such that only the carboxylic acid groups that are unreactive at room temperature for coupling reactions are present at the surface and in the surface-proximate region of the irradiated perfluoropolymers such as PTFE, for example.

In examining PTFE micropowder functionalized with carboxylic acid, Lappan and Geißler observed that only a small fraction of carboxylic acid groups at the particle surface is accessible for titration; that is, these —COOH groups at the particle surface hydrolyze especially quickly [Macromol. Mater. Eng. 2008, 293, 538-542]. Above all, the polyelectrolyte titration covers the very low surface-proximate concentration of carboxylic acid groups. It was also described that the carboxylic acid groups are not thermally stable at temperatures above 200° C.

A disadvantage of the known solutions from the prior art is the still-inadequate assembly properties and/or sliding friction properties for plastic surfaces that are intended for use under tribological conditions, as well as the degree of wear, which is still too high.

The object of the present invention is to provide modified plastic surfaces with perfluoropolymers, whereby plastic surfaces that are intended for use under tribological conditions have substantially improved assembly properties and/or sliding friction properties and exhibit a very low degree of wear. Furthermore, the object of the present invention is to provide a simple and cost-effective method for producing modified plastic surfaces with perfluoropolymers.

The objects are attained by the invention disclosed in the claims. Advantageous embodiments are the subject matter of the dependent claims.

In the modified plastic surfaces with perfluoropolymers, after a reactive conversion under mechanical stress at room temperature at least the reactive —NH groups and/or —OH groups present at the surface of plastics are present in a chemically covalently coupled manner with the perfluoropolymer carboxylic acid halide present at least in the surface-proximate region of modified perfluoropolymer (micro)powders and/or with the grafted (meth)acrylic acid halide present via perfluoropolymer (peroxy) radicals of the perfluoropolymer (micro)powders and/or (meth)acrylic acid that has been modified into (meth)acrylic acid halide before the reactive conversion.

Advantageously, the plastics are molded parts and/or component parts that are polymeric compounds with reactive —NH groups and/or —OH groups.

Likewise advantageously, polymeric compounds with reactive —NH groups and/or —OH groups are present as plastics, which compounds are advantageously polyamides, polyester amides, polyether amides, polyether ester amides, polyamide amines, polyamide imides, polyurethanes, polyurethane ureas, polyether ureas, polyether amide ureas, polyester ureas, polyester amide ureas, polyether ester ureas, polyether ester amide ureas, each with —$NH_2$ amino groups and/or —NHR amino groups (with R=alkyl, alkylaryl and aryl) and/or —$NH_2$ and/or —NHR* amide groups (with R*=alkyl and alkylaryl) and/or —OH groups and are mixtures thereof or with other polymers.

Further advantageously, the following are present as polymeric compounds with reactive —NH groups and/or —OH groups:
- aliphatic and/or partially aromatic polyamides and mixtures/blends thereof and/or mixtures/blends with other polymers; and/or
- PUR casting resins; and/or
- TPU (thermoplastic polyurethanes) and TPU mixtures/blends and mixtures/blends with other polymers; and/or
- thermoplastic polyester amides and/or polyether amides and/or polyether ester amides (PEBA) with aliphatically substituted —NH groups and mixtures/blends thereof and mixtures/blends with other polymers; and/or
- thermosets and specifically fiber-reinforced thermosets such as for example BMC (bulk molding compound) or SMC (sheet molding compound) as a pre-preg and/or cured material, advantageously on an epoxy resin base without or with a subsequent modification at the surface, for example, with ammonia and/or (poly)amine; and/or
- polymers or polymer mixtures/blends which, in addition to the reactive —NH groups and/or —OH groups, also have olefinically unsaturated double bonds that are additionally further modified at the surface by a modification reaction, advantageously by chlorohydrin formation or epoxidation and possibly then also in a further reaction with ammonia and/or (poly)amine;
- polymers or polymer mixtures/blends which have olefinically unsaturated double bonds that are further modified at the surface by a modification reaction, advantageously by chlorohydrin formation or epoxidation and possibly then also in a reaction with ammonia and/or amine.

And also advantageously, modified perfluoropolymer (micro)powders are present which have been modified by means of radiation-chemical and/or plasma-chemical treatment.

It is also advantageous if modified PTFE and/or PFA and/or FEP, advantageously PTFE and/or PFA and/or FEP modified by means of radiation-chemical and/or plasma-chemical treatment, are present as modified perfluoropolymer (micro)powders.

Furthermore, it is advantageous if the modified perfluoropolymer (micro)powders comprise perfluoropolymer carboxylic acid chloride as perfluoropolymer carboxylic acid halide and (meth)acrylic acid chloride as radically grafted (meth)acrylic acid halide.

It is likewise advantageous if the surface of the plastics is locally or at least partially, preferably essentially completely or completely, covered and covalently coupled with modified perfluoropolymer (micro)powder.

And it is also advantageous if modified perfluoropolymer (micro)powders with particle sizes in the range between 60-80 nm to 500 μm, preferably in the range from 200 nm to 5 μm, are present.

In the method according to the invention for producing modified plastic surfaces with perfluoropolymer (micro)powders, modified perfluoropolymer (micro)powders which at least in the surface-proximate region of the modified perfluoropolymer (micro)powder particles comprise reactive carboxylic acid halide and/or comprise (meth)acrylic acid halide grafted via perfluoropolymer (peroxy) radicals of the perfluoropolymer (micro)powders are applied at room temperature to a solid surface of plastics which at least at the surface comprise reactive —NH groups and/or —OH groups, and a reactive conversion under mechanical stress is carried out during and/or after the application of the modified perfluoropolymer (micro)powders.

For the grafting of the modified perfluoropolymer (micro)powders via perfluoropolymer (peroxy) radicals, (meth)acrylic acid monomers are advantageously added which are modified into (meth)acrylic acid halide after the grafting reaction and before the reactive conversion.

Likewise advantageously, modified PTFE powder and/or PFA powder and/or FEP powder, advantageously PTFE powder and/or PFA powder and/or FEP powder modified by means of radiation-chemical and or plasma-chemical treatment, are used as modified perfluoropolymer (micro)powders.

Further advantageously, radiation-chemically modified perfluoropolymer (micro)powders are used which have been modified with a radiation dose of >50 kGy and preferably ≥100 kGy.

And also advantageously, modified perfluoropolymer (micro)powders are used which have been radiation-chemically modified in the presence of reactants and preferably with exposure to oxygen.

It is also advantageous if modified perfluoropolymer (micro)powders with perfluoropolymer carboxylic acid chloride are used as perfluoropolymer carboxylic acid halide and (meth)acrylic acid chloride is used as radically grafted (meth)acrylic acid halide.

It is further advantageous if modified perfluoropolymer (micro)powders are used which have carboxylic acid halide groups and preferably carboxylic acid chloride groups, at concentrations of at least 5 mmol/kg perfluoropolymer and preferably >30 mmol/kg.

It is likewise advantageous if polymeric compounds with reactive —NH groups and/or —OH groups are used as plastics, and the compounds can be alkylated and/or acylated at the —NH group.

And it is also advantageous if polymeric compounds with reactive —NH groups and/or —OH groups are used as plastics, which compounds are advantageously polyamides, polyester amides, polyether amides, polyether ester amides, polyamide amines, polyamide imides, polyurethanes, polyurethane ureas, polyether ureas, polyether amide ureas, polyester ureas, polyester amide ureas, polyether ester ureas, polyether ester amide ureas, each with —NH$_2$ amino groups and/or —NHR amino groups (with R=alkyl, alkylaryl and aryl) and/or —NH$_2$ and/or —NHR* amide groups (with R*=alkyl and alkylaryl) and/or —OH groups and are mixtures thereof or with other polymers.

It is also advantageous if the modified perfluoropolymer (micro)powders are applied to the plastic surface at room temperature, preferably at 18 to 25° C.

And it is further advantageous if modified perfluoropolymer (micro)powders are applied to a solid plastic surface which has a temperature of up to 200° C., preferably up to 150° C.

It is likewise advantageous if the reactive conversion is achieved under mechanical stress
- via compressive stress, such as rubbing and/or brushing and/or ultrasound without or with carrier bodies composed of metal and/or ceramic and/or plastic, and/or
- via stressing by accelerated carrier bodies composed of metal and/or ceramic and/or plastic, wherein the mechanical stress is applied during and/or after the application of the radiation-chemically and/or plasma-chemically modified perfluoropolymer (micro)powders to the solid plastic surface.

And it is also advantageous if the application of the modified perfluoropolymer (micro)powders is carried out before the reactive conversion under mechanical stress and the modified perfluoropolymer (micro)powder is positioned on the solid plastic surface via electrostatic adsorption.

With the present invention, it becomes possible for the first time to provide modified plastic surfaces with perfluoropolymers, whereby plastic surfaces that are intended for use under tribological conditions have substantially improved assembly properties and/or sliding friction properties and exhibit a very low degree of wear. Likewise, it becomes possible for the first time to produce modified plastic surfaces of this type with a simple and cost-effective method.

This is achieved by modified plastic surfaces with perfluoropolymers in which, after a reactive conversion under mechanical stress at room temperature, at least the reactive —NH groups and/or —OH groups present at the surface of plastics are present in a chemically covalently coupled manner with the perfluoropolymer carboxylic acid halide present at least in the surface-proximate region of modified perfluoropolymer (micro)powders and/or with the grafted (meth)acrylic acid halide present via perfluoropolymer (peroxy) radicals of the perfluoropolymer (micro)powders and/or (meth)acrylic acid that has been modified into (meth)acrylic acid halide before the reactive conversion.

With the solution according to the invention, modified perfluoropolymer (micro)powders which at least at the surface of the modified perfluoropolymer (micro)powder particles comprise carboxylic acid halides and/or comprise (meth)acrylic acid halides grafted via perfluoropolymer (peroxy) radicals of the perfluoropolymer (micro)powders and/or (meth)acrylic acid that was grafted via perfluoropolymer (peroxy) radicals of the perfluoropolymer (micro) powders, but was subsequently modified into (meth)acrylic acid halide before the reactive conversion, are chemically covalently coupled with plastic surfaces which at least at the surface comprise reactive —NH groups and/or —OH groups, whereby the plastic surfaces that are intended for use under tribological conditions have substantially improved tribological properties.

Within the scope of this invention, perfluoropolymer (peroxy) radicals are to be understood as meaning all radicals of perfluoropolymers, in particular also perfluoroalkyl (peroxy) radicals, which are created either during the production of the perfluoropolymers and/or during a subsequent modification, such as a radiation-chemical and/or plasma-chemical modification, for example.

Molded parts and/or component parts that are polymeric compounds with reactive —NH groups and/or —OH groups are advantageously present as plastics.

Within the scope of the present invention, reactive —NH groups are to be understood as meaning primary and secondary amines and/or all aliphatic compounds with amide groups, urea groups, urethane groups, allophanate groups, biuret groups, sulfonamide groups, and also amide compounds, urea compounds, urethane compounds, allophanate compounds and biuret compounds and sulfonamide compounds which were formed with ammonia and/or a primary aliphatic amine and have at least one other —NH$_2$ and/or —NH group.

In other words, compounds with reactive —NH groups are understood as meaning all those compounds and above all polymers which can be alkylated at the —NH group and/or which react with carboxylic acid halide.

Within the scope of the present invention, plastics with —OH groups are to be understood as meaning all those polymer compounds which have alcoholic, such as aliphatically bonded, and/or phenolic, such as aromatically bonded, —OH groups, wherein due to the carbonyl activity the ester groups with perfluoroalkylcarboxylic acid halides, which groups are formed by reactive conversion, have a lower hydrolysis resistance than the ester groups formed with (meth)acrylic acid halide. For this reason, the modified perfluoropolymer (micro)powders with additionally grafted (meth)acrylic acid halides are preferably used for the reactive conversion with a coupling via covalent ester groups of modified perfluoropolymers on plastic surfaces with only —OH groups.

In many cases, the plastics have on the surface reactive —NH groups and —OH groups or only reactive —NH groups or only —OH groups, such that the ordinarily skilled artisan can use his technical knowledge to decide which modified perfluoropolymer (micro)powders he will preferably use for the surface modification—whether he will use the modified perfluoropolymer (micro)powders with only perfluoroalkylcarboxylic acid halide and/or whether he will use the modified perfluoropolymer (micro)powders with only grafted (meth)acrylic acid halide or whether he will use the modified perfluoropolymer (micro)powders with perfluoroalkylcarboxylic groups and grafted (meth)acrylic acid halide or whether he will use the modified perfluoropolymer (micro)powders with perfluoroalkylcarboxylic acid halide and grafted (meth)acrylic acid halide for the reactive conversion under mechanical stress, which he can also easily test in a few trials, with which perfluoropolymer modifier he will obtain the optimal surface modification.

Polymeric compound classes of this type are advantageously polyamides, polyester amides, polyether amides, polyether ester amides, polyamide amines, polyamide imides, polyurethanes, polyurethane ureas, polyether ureas, polyether amide ureas, polyester ureas, polyester amide ureas, polyether ester ureas, polyether ester amide ureas, each with —NH$_2$ amino groups and/or —NHR amino groups (with R=alkyl, alkylaryl and aryl) and/or —NH$_2$ and/or —NHR* amide groups (with R*=alkyl and alkylaryl) and/or —OH groups and are mixtures thereof or with other polymers.

Advantageously, polymeric compounds with reactive —NH groups are
- aliphatic and/or partially aromatic polyamides and mixtures/blends thereof and/or mixtures/blends with other polymers; and/or
- PUR casting resins, which can also contain —OH groups; and/or
- TPU (thermoplastic polyurethanes) and TPU mixtures/blends, which can also contain —OH groups, and mixtures/blends with other polymers; and/or
- thermoplastic polyester amides and/or polyether amides and/or polyether ester amides (PEBA) with aliphatically substituted —NH groups and mixtures/blends thereof, which can also contain —OH groups, and mixtures/blends with other polymers; and/or
- thermosets and specifically of fiber-reinforced thermosets such as for example BMC (bulk molding compound) or SMC (sheet molding compound) as pre-preg and/or cured material, which have reactive —NH groups at the surface due to a special modification; and/or
- elastomers and/or thermoplastics and/or thermosets or polymer mixtures/blends which, in addition to the reactive —NH groups, also have —OH groups and/or olefinically unsaturated double bonds.

Advantageously, modified perfluoropolymer (micro)powders are present which have been modified by means of radiation-chemical and/or plasma-chemical treatment.

PTFE and/or PFA and/or FEP advantageously modified by means of radiation-chemical and/or plasma-chemical treatment, the surface-proximate perfluoroalkylcarboxylic acid groups of which (that were created by hydrolysis from perfluoroalkylcarboxylic acid fluoride) were modified into carboxylic acid halide, and/or PTFE and/or PFA and/or FEP advantageously chemically modified by radical grafting with (meth)acrylic acid halide, and/or (meth)acrylic acid that was modified into (meth)acrylic acid halide, are present as modified perfluoropolymer (micro)powders.

It is thereby advantageous if the modified perfluoropolymer (micro)powders comprise perfluoropolymer carboxylic acid chloride as perfluoropolymer carboxylic acid halide and/or (meth)acrylic acid chloride as radically grafted (meth)acrylic acid halide.

The covalent coupling according to the invention takes place between the perfluoropolymer carboxylic acid halide of the modified perfluoropolymer (micro)powder and/or between the (meth)acrylic acid halide grafted to the perfluoropolymer (peroxy) radicals of the perfluoropolymer (micro)powders and/or between the (meth)acrylic acid that was grafted to the perfluoropolymer (peroxy) radicals of the perfluoropolymer (micro)powders and was modified into (meth)acrylic acid halide before the reactive conversion, and the reactive —NH groups and/or —OH groups at least on the surface of the plastics, such that the perfluoropolymer (micro)powders are chemically covalently bonded, and as a result fixed, to the plastic surface.

The surface of the plastics should thereby be preferably essentially completely or completely covered and covalently coupled with modified perfluoropolymer (micro)powder in an at least partially or locally defined manner.

Powders with particle sizes in the range between 60-80 nm as the lower primary particle size of special PTFE emulsion polymers to 500 μm as agglomerates, in particular agglomerated perfluoropolymer particles, preferably in the rage of 200 nm to 5 μm, are present as perfluoropolymer (micro)powders.

With the plastic surfaces modified according to the invention, plastic molded parts and/or plastic component parts are present with which, as a result of the perfluoropolymer (micro)powders applied and covalently coupled under mechanical stress, a perfluoropolymer solid lubricant is present on the plastic molded part surface and/or plastic component part surface, which lubricant is chemically coupled and fixed in this location.

Thus, in tribological applications of the plastic molded parts and/or plastic component parts, substantially improved assembly properties and/or sliding friction properties are present as well as a very low degree of wear, which also results in a longer service life of the plastic molded parts and/or plastic component parts.

In the method according to the invention, modified perfluoropolymer (micro)powders which at least in the surface-proximate region of the modified perfluoropolymer (micro)powder particles comprise reactive carboxylic acid halide and/or comprise (meth)acrylic acid halide grafted via perfluoropolymer (peroxy) radicals of the perfluoropolymer (micro)powders are applied at room temperature to a solid surface of plastics which at least at the surface comprise reactive —NH groups and/or —OH groups, and a reactive conversion under mechanical stress is carried out during and/or after the application of the modified perfluoropolymer (micro)powders.

According to the invention, perfluoropolymer (micro)powders grafted with (meth)acrylic acid monomers can also be added as starting materials for producing the modified plastic surfaces according to the invention, wherein the grafted (meth)acrylic acid is modified into (meth)acrylic acid halide before the reactive conversion, however, and is then present as (meth)acrylic acid halide grafted via perfluoropolymer (peroxy) radicals of the perfluoropolymer (micro)powders for the reactive conversion. Thus, perfluoropolymer (micro)powders with grafted (meth)acrylic acid halide are always present before the reactive conversion.

Advantageously, perfluoropolymer (micro)powders created chemically by radical grafting via perfluoropolymer (peroxy) radicals with (meth)acrylic acid halide and/or (meth)acrylic acid that was subsequently, but before the reactive conversion, modified into (meth)acrylic acid halide, and wherein the grafting reaction took place from (meth)acrylic acid (halide) onto perfluoropolymer (micro)powders, are used as modified perfluoropolymer (micro)powders. These perfluoropolymer (peroxy) radicals originate from the polymerization process of the perfluoropolymer (micro)powders or are present after the radiation-chemical and/or plasma-chemical modification of perfluoropolymer (micro)powders.

Advantageously, modified perfluoropolymer (micro)powders of this type are modified PTFE (micro)powders and/or PFA (micro)powders and/or FEP (micro)powders, and/or advantageously PTFE (micro)powders and/or PFA (micro)powders and/or FEP (micro)powders modified by means of radiation-chemical and/or plasma-chemical treatment, the surface-proximate perfluoropolymer carboxylic acid groups of which were modified into perfluoropolymer carboxylic acid halide.

Advantageously, radiation-chemically modified perfluoropolymer (micro)powders which have been modified with a radiation dose of >50 kGy and preferably ≥100 kGy are used as modified perfluoropolymer (micro)powders that comprise at least at the surface of the modified perfluoropolymer (micro)powder particles reactive perfluoropolymer carboxylic acid halide and/or preferably comprise (meth)acrylic acid halide grafted via perfluoropolymer (peroxy) radicals of the perfluoropolymer (micro)powders.

In the case of the radiation-chemical modification of the perfluoropolymer (micro)powders, it is further advantageous to carry this out in the presence of reactants and preferably with exposure to oxygen. Through the radiation-chemical and/or plasma-chemical treatment of the perfluoropolymer (micro)powders in the presence of oxygen, perfluoropolymer (peroxy) radicals as well as functional groups are generated, wherein in the presence of oxygen the perfluoropolymer peroxy radicals accessible to oxygen are created at the perfluoropolymer particle surface during the treatment.

It is thereby advantageous if powders with perfluoropolymer carboxylic acid chloride as perfluoropolymer carboxylic acid halide and/or (meth)acrylic acid chloride as radically grafted (meth)acrylic acid halide are used as modified perfluoropolymer (micro)powders.

Overall, it is very advantageous if the modified perfluoropolymer (micro)powders used comprise carboxylic acid halide groups and preferably carboxylic acid chloride groups, at concentrations of at least 5 mmol/kg perfluoropolymer in the surface-proximate region of the perfluoropolymer particles and preferably >30 mmol/kg.

For the radiation-chemical and/or plasma-chemical modification, the perfluoropolymer (micro)powders can be used in pure form or as a mixture, wherein reclaimed/recycled materials can also be used. It has proven advantageous to pulverize radiation-chemically and/or plasma-chemically modified perfluoropolymer (micro)powders, but it is not absolutely necessary. The radiation-chemical and/or plasma-chemical modification of the perfluoropolymer (micro)powders is carried out according to known methods in that the perfluoropolymer (micro)powder is irradiated with high-energy electromagnetic radiation such as gamma rays and/or X-rays and/or particle radiation such as electron beams at a radiation dose of at least 50 kGy and advantageously >100 kGy under inert gas or preferably in the presence of reactants, such as (atmospheric) oxygen for example, and in that in this manner a concentration of $>5 \cdot 10^{16}$ spin/$g_{perfluoropolymer}$ and preferably $>10^{18}$ spin/$g_{perfluoropolymer}$ of perfluoropolymer (peroxy) radicals in the surface-proximate region of the perfluoropolymer (micro)powder particles is created for the potential subsequent radical grafting of (meth)acrylic acid halide and/or (meth)acrylic acid that was subsequently, but before the reactive conversion, modified into (meth)acrylic acid halide, and for the (direct) perfluoropolymer functionalization with perfluoropolymer carboxylic acid fluoride groups and perfluoropolymer carboxylic acid groups at concentrations of at least 5 mmol/kg perfluoropolymer of the perfluoropolymer particles and preferably >30 mmol/kg in the surface-proximate region. The irradiation of perfluoropolymer (micro)powders with radiation doses of 100 to 2000 kGy has proven technically advantageous, wherein the generated radical concentrations are highly dependent on the respective radiation process management and on the type of perfluoropolymer (micro)powder used. On the other hand, specially polymerized and/or plasma-treated perfluoropolymer (micro)powders with a concentration of $>0.5 \cdot 10^{17}$ $spinig_{perfluoropolymer}$ of perfluoroalkyl (peroxy) radicals in the surface-proximate region of the perfluoropolymer (micro)powder particles from the polymerization process and/or plasma modification process can also be used for the functionalization/modification by grafting with (meth)acrylic acid (halide).

According to the invention, polymeric compounds with reactive —NH groups and/or —OH groups on the plastic surface are advantageously used as plastics, which compounds are advantageously polyamides, polyester amides, polyether amides, polyether ester amides, polyamide amines, polyamide imides, polyurethanes, polyurethane ureas, polyether ureas, polyester ureas, polyether ester ureas, each with reactive —NH$_2$ and/or —NHR amino groups (with R=alkyl and/or aryl) and/or —NH$_2$ and/or —NHR amide groups (with R=alkyl) and/or —OH groups and are mixtures thereof or with other polymers.

Likewise advantageously, the reactive conversion is carried out under mechanical stress at room temperature, preferably at 18-25° C.

Advantageously, the modified perfluoropolymer (micro) powder can also be applied to a solid plastic surface which has a temperature of up to 200° C., preferably 150° C., taking into account the thermal stability and/or thermal dimensional stability.

For the solution according to the invention, it is of particular significance that the reactive conversion is achieved under mechanical stress, which can advantageously be effected
via compressive stress, such as rubbing and/or brushing and/or ultrasound without or with carrier bodies composed of metal and/or ceramic and/or plastic, and/or
via stressing by accelerated carrier bodies composed of metal and/or ceramic and/or plastic, wherein the mechanical stress is applied during and/or after the application with perfluoropolymer carboxylic acid halide-modified and/or (meth)acrylic acid halide-modified perfluoropolymer (micro)powders to the solid plastic surface according to the reactive —NH coupling group(s) and/or —OH coupling group(s) present on the plastic surface.

Through the application of the modified perfluoropolymer (micro)powders before the reactive conversion under mechanical stress, the modified perfluoropolymer (micro)powder can advantageously be positioned on the solid plastic surface via electrostatic adsorption, for example, locally through a mask or across the entire area.

The chemical coupling between the plastic surface and the perfluoropolymer (micro)powder is first achieved through the mechanical stressing of the modified perfluoropolymer (micro)powders according to the invention during and/or after the application to the solid plastic surface at room temperature. The chemical coupling takes place via a reaction of the carboxylic acid halide groups of the modified perfluoropolymer (micro)powder, and/or via the (meth) acrylic acid halide grafted to the perfluoroalkyl (peroxy) radicals of the perfluoropolymer (micro)powders, with the reactive —NH groups and/or —OH groups of the plastics, with covalent bonds thereby being formed, whereby perfluoropolymer (micro)powder particles are fixed on the plastic surface.

It is thereby of significance, and should be noted, that the perfluoropolymer carboxylic acid fluoride groups generated during the advantageous radiation-chemical and/or plasma-chemical treatment of the perfluoropolymer (micro)powders and the perfluoropolymer carboxylic acid groups formed by hydrolysis, both groups being of the modified perfluoropolymer (micro)powder, and/or the perfluoropolymer (peroxy) radicals of the perfluoropolymer (micro)powders are however mostly located not directly on the perfluoropolymer particle surface, but rather in the amorphous, partly surface-proximate regions and, being covered by perfluoropolymer chains, are not freely accessible and thus sterically hindered from reacting. In addition, the reactive —COF groups generated by the radiation-chemical modification immediately hydrolyze into weakly reactive perfluoropolymer —COOH groups on contact with (air) humidity/water molecules, with a separation of hydrogen fluoride thereby taking place. The hydrolysis caused by air humidity takes place from the surface into the depth of the perfluoropolymer particle border zones in accordance with the accessibility of the —COF groups to water molecules.

Accordingly, it is also necessary that, before use of the modified perfluoropolymer (micro)powders, the reactivation at least of the perfluoropolymer carboxylic acid groups that are surface-proximate and accessible as a result of mechanical stress in order to form perfluoropolymer carboxylic acid halide and preferably acid chloride and/or an activation by radical grafting of (meth)acrylic acid halide and preferably (meth)acrylic acid chloride of the perfluoropolymer particles and the protection of these groups against a renewed hydrolysis before the coupling reaction has taken place under mild conditions on a molded part surface or component part surface with accessible reactive —NH groups and/or —OH groups is carried out to be able to chemically and technologically produce these modified plastic surfaces according to the invention.

For this purpose, a chemical coupling is achieved on the molded part surface or component part surface composed of plastic with reactive —NH groups and/or —OH groups after the application of radiation-chemically modified perfluoropolymer that was reactivated as carboxylic acid chloride and/or activated as perfluoropolymer grafted with (meth) acrylic acid chloride as powder or as a dispersion, preferably in the form of a paste, in an inert medium (solvent/dispersant/oil) under a mechanical stress. The chemical coupling takes place via a reaction of the reactive perfluoropolymer carboxylic acid halide located in proximity to the surface and/or of the grafted (meth)acrylic acid halide with reactive —NH groups and/or —OH groups at the plastic surface, with covalent bonds thereby being formed, whereby perfluoropolymer particles are fixed on the plastic surface.

With the solution according to the invention, it is for the first time possible to eliminate the known disadvantage of the prior art that only a small fraction of carboxylic acid groups at the particle surface is accessible for titration, that is, these —COOH groups at the particle surface hydrolyze especially quickly [Macromol. Mater. Eng. 2008, 293, 538-542], and that only a very low surface-proximate concentration of carboxylic acid groups is present. The cause of these disadvantages is that the functional groups in the amorphous regions at the surface and in the surface-proximate region are for the most part shielded by perfluoroalkyl chains of the perfluoropolymers and are thus not accessible for titration or reactions.

Through the mechanical stress necessary according to the invention, the perfluoropolymer chains of the perfluoropolymer (micro)powder particle surface are moved and, as a result, functional groups in the form of the perfluoropolymer halide and/or (meth)acrylic acid halide, which were previously covered by the perfluoropolymer chains, are exposed and can react in direct contact with the reactive —NH groups and/or —OH groups of the plastic surface, with covalent bonds thereby being formed, which can only occur with direct contact between the perfluoropolymer carboxylic acid halide and/or the grafted (meth)acrylic acid halide with the reactive —NH groups and/or —OH groups, and the considerably stronger and stable covalent coupling of the powder on the plastic surface is thus achieved.

It is also advantageous if, after the application the modified perfluoropolymer (micro)powders are positioned on the solid plastic surface, for example by electrostatic adsorption, only locally at the sites which are to be tribologically stressed at a later point.

In this manner, a movement of the plastic surface, that is, in the form of molded parts and component parts, is also possible before the mechanical stress, and the powder cannot change its position on the surface, or cannot significantly do so, since it is electrostatically fixed.

In the event that the modified perfluoropolymer (micro) powders are applied to the plastic surface in an inert medium, all inert fluids which do not result in a change to the carboxylic acid halide groups, such as for example naphtha, toluene, xylene, polyester oil, PAO oil, mineral oil, silicone oil, PFPE (perfluoropolyether oil) or mixtures thereof, can be used as an inert medium, wherein it is advantageous to use concentrated dispersions or, better yet, pastes, and wherein even though ether solvents and halogenated solvents and amide solvents such as for example dry DMF, NMP, dimethylacetamide, diethyl ether, etc. can be used, they cannot be recommended for the various reasons known to the ordinarily skilled artisan, such as fire safety, explosion protection, toxicity, etc.

According to the invention, it is furthermore of importance that the reactive conversion takes place under mechanical stress, which can advantageously be a compressive stress, such as rubbing and/or brushing and/or ultrasound without or with carrier bodies composed of metal and/or ceramic and/or plastic, and/or a stressing by accelerated carrier bodies composed of metal and/or ceramic and/or plastic, wherein the modified perfluoropolymer (micro)powder has previously been positioned on the plastic surface and/or is used together with the accelerated carrier bodies and/or such that it is electrostatically adsorbed on the carrier body surface, for example.

In contrast to the prior art in DE 100 42 566 A1, in which among other things perfluorinated polymeric compounds with at least one functionality are applied and fixed under application of increased pressure and temperature for passivation, it is necessary according to the invention that the perfluoropolymer particle agglomerates, and subsequently the surface-proximate regions of the individual perfluoropolymer (micro)powder particles, break up due to a mechanical stress, whereby the exposure of the perfluoropolymer carboxylic acid halide and/or of the grafted (meth)acrylic acid halide is achieved, and whereby the reactive conversion and coupling can then take place to a sufficient extent.

The mechanical stress is, for example, effected by methods such as a rubbing of the pure modified perfluoropolymer (micro) powder on the plastic surface by means of an opposing body and/or a rubbing in combination with carrier bodies composed of metal and/or ceramic and/or plastic together with modified perfluoropolymer (micro)powder and/or a rubbing in combination with carrier bodies composed of metal and/or ceramic and/or plastic, on the surface of which bodies modified perfluoropolymer (micro)powder is present such that it is adsorbed by means of charges/electrostatically, and/or a brushing of the modified perfluoropolymer (micro) powder on the plastic surface and/or a brushing of the modified perfluoropolymer (micro) powder in combination with carrier bodies composed of metal and/or ceramic and/or plastic and/or ultrasound (vibrations), in that the sonotrode rubs in modified perfluoropolymer (micro)powder directly as an opposing body on the plastic surface across the entire area or locally and/or ultrasound (vibrations), in that the sonotrode rubs in modified perfluoropolymer (micro)powder as an opposing body in combination with carrier bodies composed of metal and/or ceramic and/or plastic on the plastic surface across the entire area or locally and/or ultrasound (vibrations), in that the sonotrode excites a container in which plastic component parts/plastic molded parts are positioned together with modified perfluoropolymer (micro)powder and (carrier) bodies composed of metal and/or ceramic and/or plastic, preferably in the form of balls, and/or a modification in a vibrating mill in which the plastic component parts/plastic molded parts are positioned together with modified perfluoropolymer (micro)powder and (carrier) bodies composed of metal and/or ceramic and/or plastic, preferably in the form of balls, and/or a modification in a shaker/vibrator in which the plastic component parts/plastic molded parts are positioned together with modified perfluoropolymer (micro)powder and (carrier) bodies composed of metal and/or ceramic and/or plastic, preferably in the form of balls, and/or a modification in a tumbling dryer in which the plastic component parts/plastic molded parts are positioned together with modified perfluoropolymer (micro)powder and (carrier) bodies composed of metal and/or ceramic and/or plastic, preferably in the form of balls, and/or accelerated carrier bodies composed of metal or ceramic or glass or plastic, on the surface of which bodies the modified perfluoropolymer (micro)powder is present such that it is absorbed by means of charges/electrostatically and which bodies are projected in an accelerated manner onto the plastic surface by means of compressed air [for example, www.kst-hagen.de, Kugelstrahltechnik GmbH Hagen] or by a twister [www.twister-sand-strahl-anlage.de, BMF GmbH, Chemnitz] in the form of a modified/adapted (sand) blasting method, and/or accelerated carrier bodies composed of metal or ceramic or plastic which are projected onto the plastic surface in an accelerated manner together with the modified perfluoropolymer (micro)powder and which are projected onto the plastic surface in an accelerated manner by means of compressed air in the form of a modified/adapted sandblasting method, and/or accelerated carrier bodies composed of metal or ceramic or plastic, on the surface of which bodies the modified perfluoropolymer (micro)powder is present such that it is adsorbed by means of charges/electrostatically and which bodies, in the case of magnetic carrier materials, are projected in an electromagnetically accelerated manner onto the plastic surface, and/or accelerated carrier bodies composed of metal or ceramic or plastic, which bodies are projected onto the plastic surface in an accelerated manner together with the modified perfluoropolymer (micro)powder and, in the case of magnetic carrier materials, are projected in an electromagnetically accelerated manner onto the plastic surface.

The mechanical stress is thereby preferably effected under dry conditions, which means that the surfaces of the friction components and/or of the carrier bodies as well as the plastic surface to be modified are used in a dry state.

The individual method types for the mechanical stress can be used separately or, where technically feasible, also in a combined manner to modify the plastic surfaces. Furthermore, the use as an individual method or as a combined method also depends on whether a plastic surface is to be modified only locally or across the entire area, which the ordinarily skilled artisan can easily decide and test in a few trials.

Under mechanical and therefore also tribological stress during the modification of the plastic surfaces and/or in the application case, the chemically coupled perfluoropolymer (micro)powder particles are further comminuted, wherein the sections in immediate proximity or at another location can again be bonded to free reactive groups under mechanical stress, in particular friction, and are thus fixed at the plastic surface, and as a result a further disaggregation and distribution on the desired plastic surface or a subregion thereof emerges and/or is achieved. On the other hand, it is advantageous if a most complete and optimal possible coverage with coupled perfluoropolymer (micro)powder particles is already achieved during production of the modified plastic surfaces under the production conditions according to the invention.

Advantageously, a further disaggregation and distribution on the plastic surface is achieved through (re)activated perfluoropolymer particles dispersed in inert media, for example, in PAO and/or mineral oil and/or ester oil and/or silicone oil or PFPE (perfluoropolyether oil). On the other hand, it is advantageous if an optimal coverage of fixed perfluoropolymer particles is already achieved during production with corresponding modification conditions.

In the modification of plastic surfaces with the (re) activated perfluoropolymer particles dispersed in inert media, the inert medium can, after the modification and coupling/fixing of perfluoropolymer particles, be removed again with the remaining unbonded perfluoropolymer particles, for example by washing, or the medium will remain on the modified plastic surface, which the ordinarily skilled artisan will respectively decide in accordance with the field of application.

For the tribological modification of the entire plastic surface or only locally, that is, in a limited manner of parts of the surface, of molded parts or component parts which have reactive —NH groups and/or —OH groups at the surface, the following plastics are used:

for molded parts composed of aliphatic and/or partially aromatic polyamides and mixtures/blends thereof and with other polymers;

for molded parts and component parts composed of thermosetting PUR casting resins;

for molded parts and component parts composed of TPU (thermoplastic polyurethanes) and TPU mixtures/blends and mixtures/blends with other polymers;

for molded parts and component parts composed of thermoplastic polyester amides and/or polyether amides and/or polyether ester amides (PEBA) and mixtures/blends thereof and with other polymers;

for molded parts and component parts composed of thermoset and specifically of fiber-reinforced thermosets such as for example BMC (bulk molding compound) or SMC (sheet molding compound) as a prepreg and/or cured material, advantageously on an epoxy resin base without or with a subsequent modification at the surface, for example, with ammonia and/or (poly)amine;

for molded parts and component parts which, as a polymer or polymer mixture/blend, in addition to the reactive —NH groups and/or —OH groups also have olefinically unsaturated double bonds that are additionally further modified at the surface in a modification reaction, for example by chlorohydrin formation or epoxidation, and possibly then also with ammonia and/or (poly)amine via a further reaction;

for molded parts and components which, as a polymer or polymer mixture/blend, have olefinically unsaturated double bonds which are further modified at the surface via a modification reaction, for example by chlorohydrin formation or epoxidation, and possibly then also with ammonia and/or (poly)amine via a further reaction.

In the method according to the invention for producing surface-modified molded parts and component parts via coupled perfluoropolymer(s), a prior bulk modification with perfluoropolymer, as is described in the prior art, is not necessary and in many cases also not advisable, since in the application cases the perfluoropolymer is to become effective at the surface, and the emergence of the tribological properties is not supposed to be delayed until after a break-in wear. On the other hand, however, bulk-modified products of this type can also be used for this surface modification.

In the case of molded parts or component parts composed of "soft" materials as a whole or only locally at the tribologically stressed zones without the surface modification according to the invention, stick-slip effects in the form of the "eraser effect" of the elastomer/rubber/TPE/TPU materials impede the formation of a tribologically effective layer on the opposing body. These disadvantages are not exhibited by materials that were modified at the surface with chemically coupled perfluoropolymer materials, since the solid lubricant can apply its effect directly in contact with the opposing body without break-in wear. With an addition or in the presence of oils or greases, it has furthermore been shown that the coupled perfluoropolymer particles also function to a certain extent as oil storage, which significantly improves the tribological properties, primarily with regard to break-in characteristics or under emergency running conditions. Surface-modified molded parts and component parts of this type have proven advantageous due to easier sliding, also under assembly conditions.

In the preferably radiation-chemical modification of perfluoropolymers into modified perfluoropolymer micropowders, functional groups and radicals are produced, wherein the surface-proximate, (re)activated groups surprisingly are not capable of coupling with polymers having reactive —NH groups and/or —OH groups in a reactive conversion at the plastic surface of molded parts and component parts until the surface-proximate perfluoropolymer carboxylic acid groups that were created by hydrolysis from the perfluoropolymer carboxylic acid fluoride groups and are unreactive under conditions according to the invention have once again been reactivated into perfluoropolymer carboxylic acid halide, and/or until (meth)acrylic acid halide monomers and/or (meth)acrylic acid monomers that are subsequently activated into (meth)acrylic acid halide after the grafting have been coupled to the perfluoropolymer in a radical grafting reaction via perfluoropolymer (peroxy) radicals, and a mechanical stress occurs in which a shearing effect must be applied to the surface layer of the perfluoropolymer (micro)powder particles in order to expose the sterically hindered carboxylic acid halide and preferably the carboxylic acid chloride (—COCl) groups. With a plasma treatment, groups which are functional at the surface can be analogously produced and used for this coupling reaction.

For example, after the method according to the invention, it was possible to verify chemically fixed perfluoropolymer for molded parts (plates) for example composed of PA6, PA66/GF30 and PEBA (TPE-A, polyether block amide) and PU (polyurethane) as a TPU plate, as a polyurethane lacquer layer and as a polyurethane casting resin plate on the surface via REM, EDX and ATR spectroscopy after the surface treatment by rubbing and after the clearing of unbonded perfluoropolymer. No coupling and fixing were observed without the rubbing. The coupling and fixing were verifiable in the treatment at room temperature and also with plates/substrate surfaces/molded part surfaces preheated to 100° C.

The coupling and fixing according to the invention of the perfluoropolymer (micro)powders on the molded part surfaces leads to an improvement of the sliding friction properties and to an increase in wear resistance in the block/ring test compared to the unmodified surfaces. To further improve the wear resistance, it is advantageous to simultaneously utilize the chemically coupled perfluoropolymer (micro)powder particles as a storage medium for oils and greases as well as the perfluoropolyether oil PFPE. Because the PFPE is not compatible with the polymer matrices, it also does not dissolve in conventional oils, greases and solvents. Molded part surfaces and component part surfaces modified with perfluoropolymer (micro)powder according to the invention and subsequently treated with PFPE exhibit low friction coefficients and an increased wear resistance. If perfluoropolymer (micro)powder with —COCl groups, which powder was processed with PFPE into a paste, is used under mechanical stress for the surface modification, similar tribological properties are obtained.

The plastic surfaces modified with perfluoropolymer are produced according to the invention after, for example, a PFA emulsion polymerizate (3M/Dyneon) electron-irradiated with 500 kGy or a PTFE emulsion polymerizate (TF 2025, 3M/Dyneon) gamma-irradiated with 750 kGy in the presence of air are used in the method according to the invention for the surface modification. During the irradiation, with a degradation into micropowder thereby taking place, functional groups in the form of —COF groups, which primarily hydrolyze into —COOH groups in the surface-proximate region of the micropowder particles, and radicals are produced. Since the —COF groups, which are positioned further to the interior in the amorphous regions and difficult to access, are not suitable for the surface modification according to the invention, the perfluoropolymer (micro)powders must first be (re)activated so that they can be used for the coupling with reactive —NH surface groups and/or —OH surface groups of the molded parts and component parts, that is, for the surface modification according to the invention.

Thus, surfaces chemically modified with perfluoropolymer in a targeted manner via a coupling can only be produced with (re)activated perfluoropolymer (micro)powder.

A surface modification of this type of perfluoropolymer on polymer surfaces was not yet achieved or described prior to the invention.

As a result of the surface coupling, the molded parts and component parts exhibit better mechanical properties with respect to compressive and tensile strength as well as rigidity compared to the materials bulk-modified with perfluoropolymer, since the matrix structure is not changed, and exhibit significantly better tribological (surface) properties. These products are of interest primarily for sliding friction processes. As a result of the coupling of perfluoropolymer on the molded part surface and component part surface, an improvement in the wear resistance is achieved through the bonding, since the perfluoropolymer grain cannot be (completely) rubbed away by mechanical stress.

With the chemical coupling of perfluoropolymer at the molded part surface and component part surface, products are obtained which have low sliding friction coefficients and improved wear resistances, that is, which have a longer service life in the applications. This can be applied for dynamic sealing systems with tribologically equipped surface (regions) for a longer service life, and can also be applied in the automotive industry to prevent the undesired stick-slip phenomena in the form of squeaking and/or creaking noises. In mechanical engineering in general, component parts such as for example, sliding surfaces, bearing shells, bearing cages, sliding blocks, wipers, etc. can be surface-modified, and can thus be equipped with tribologically optimized surfaces. Analogously, moved or moving parts such as for example shafts, toothed wheels (in control or regulating gearing) and toothed belts (as regulating/control drives or as drive belts) composed of plastic or fiber-reinforced plastic, which parts have on the tribologically stressed surface a polyamide layer or polyurethane layer, can be surface-modified, that is, tribologically equipped, using this method according to the invention. This can already take place in production or can be carried out subsequently in that a (re)activated perfluoropolymer paste, for example composed of radiation-chemically modified, (re)activated PFA in PAO, is applied to this surface in a thin and well-distributed manner, wherein a tribologically modified component part surface having improved sliding friction properties and a lower degree of wear is then formed/created in operation under friction.

In many cases, lubricating lacquers have previously been used as an assembly aid for this purpose or for tribological break-in processes, which lacquers usually lose their effectiveness after only a brief period, however.

A high and stable degree of coverage is obtained which cannot be achieved merely with pressing/compression as well as pressing/compression and temperature according to the prior art. It is possible to produce surfaces that are tribologically equipped in a defined manner only to a locally limited extent or also across the entire area on molded parts and component parts, which surfaces have a low sliding friction coefficient and a higher wear resistance compared to untreated surfaces. The surface modification is preferably carried out downstream, that is, after the shaping in the cold state.

With this invention, plastic parts can be tribologically equipped at the surface so that undesired stick-slip phenomena can be eliminated and/or energy savings can be obtained through the lower friction coefficient as well as a higher wear resistance. Also, compared to the bulk-modified materials, there is no break-in wear necessary in order to obtain the tribological sliding friction properties.

The invention is explained below in greater detail with the aid of several exemplary embodiments.

(Re)activation of the perfluoropolymer (micro)powders:

(I) 25 g Zonyl MP 1100 (DuPont, supplied as radiation-chemically modified PTFE micropowder, irradiated with approx. 500 kGy) are mixed with 5 ml thionyl chloride in a 250 ml round bottom flask and agitated continuously for 6 hours by means of a vacuum rotary evaporator at a water-bath temperature of 50° C. without vacuum being applied. With a simultaneous elimination of adsorbed moisture traces in the powder, the surface-proximate carboxylic acid groups of the PTFE micropowder are converted into carbonyl fluoride groups. After the cooling, the round bottom flask is removed, sealed in an air-tight manner with a stopper, and stored for 1 additional week.

The unconverted thionyl chloride is removed by means of a vacuum rotary evaporator at a water-bath temperature of 50° C. and application of vacuum.

The reactivated PTFE micropowder is stored in a tightly sealed manner in the round bottom flask→PTFE 1

(II) 25 g PFA powder are shrink-wrapped in PE bags, electron-irradiated with 500 kGy and then reactivated as in (I)→PFA-1

(III) 25 g Algoflan L 620 (Solvay Solexis, modified PTFE micropowder) are, as described in DE 10 2006 041 511 A1, activated with acrylic acid chloride→PTFE 2

(IV) 25 g PFA powder are shrink-wrapped in PE bags, electron-irradiated with 750 kGy and then, as described in DE 10 2006 041 511 A1, activated with acrylic acid chloride and subsequently also reactivated as in (I) PFA-2

(V) 25 g Zonyl MP 1100 (DuPont, supplied as radiation-chemically modified PTFE micropowder, irradiated with approx. 500 kGy) are mixed with 5 ml thionyl chloride in 150 ml n-hexane and 10 ml PAO-8 (Lehmann & Voss & Co. KG, Hamburg) in a 250 ml three-neck flask with a toothed disc mixer and reflux condenser. The dispersion is stirred vigorously for 6 hours at a water-bath temperature of 50° C. With a simultaneous elimination of adsorbed moisture traces in the powder, the surface-proximate carboxylic acid groups of the PTFE micropowder are converted into carboxylic acid chloride groups. After cooling, the dispersion is transferred to a round bottom flask. The unconverted thionyl chloride is removed together with the n-hexane by means of a vacuum rotary evaporator at a water-bath temperature of 50° C. and application of vacuum.

The reactivated PTFE micropowder is present with the PAO-8 as a type of paste-like mass and is stored in a tightly sealed manner in the round bottom flask→PTFE-3

COMPARATIVE EXAMPLE 1

On a 60 mm×60 mm steel plate, a TPU plate with dimensions of 50 mm×50 mm and a thickness of 2 mm is positioned and covered with a thin layer of the PTFE powder Zonyl MP 1100 (DuPont, electron-irradiated with approx. 500 kGy, the surface-proximate layer of which only contains —COOH groups due to hydrolysis and does not contain —COF groups). A 60 mm×60 mm steel plate is placed thereon. On this steel plate, a vulcanized NBR plate with dimensions of 50 mm×50 mm and a thickness of 2 mm is placed, whereon another 60 mm×60 mm steel plate is placed. This stack is positioned in a press with a punch diameter of 120 mm and pressurized with 100 kN at room temperature. After 30 minutes, the pressure is released and the stack is removed. The TPU plate that was covered with PTFE powder is removed and thoroughly washed with ethanol, with a light brushing thereby taking place using a paintbrush. After the drying of the plate, the surface feels like that of the starting material. Water does not drip off the surface, but rather flows away slowly as in the case of the starting material.

No PTFE is verifiable across the entire area in the REM image, and no fluorine is verifiable in the EDX image, which means that no surface modification took place under pressure only and without (re)activation of the PTFE.

Tribological analyses in the block/ring text showed that stick-slip phenomena occur, and that no differences from the starting material emerge in terms of the sliding friction properties.

COMPARATIVE EXAMPLE 2

On a 60 mm×60 mm steel plate, a TPU plate with dimensions of 50 mm×50 mm and a thickness of 2 mm is positioned and covered with a thin layer of the PTFE powder Zonyl MP 1100 (DuPont, electron-irradiated with approx. 500 kGy, the surface-proximate layer of which only contains —COOH groups due to hydrolysis and does not contain —COF groups). A 60 mm×60 mm steel plate is placed thereon. On this steel plate, another vulcanized NBR plate with dimensions of 50 mm×50 mm and a thickness of 2 mm is placed, whereon another 60 mm×60 mm steel plate is placed. This stack is positioned in a press with a punch diameter of 120 mm and pressurized with 100 kN at a temperature of 100° C. After 30 minutes, the pressure is released and the stack is removed. The TPU plate that was covered with PTFE powder is removed and thoroughly washed with ethanol, with a light brushing thereby taking place using a paintbrush. After the drying of the plate, the surface feels like that of the starting material. The results are analogous to Comparative Example 1, which means that no surface modification took place under pressure and temperature only and without (re)activation of the PTFE, nor did any differences from the starting material emerge in terms of the sliding friction properties.

COMPARATIVE EXAMPLE 3

On a 60 mm×60 mm steel plate, a vulcanized TPU plate with dimensions of 50 mm×50 mm and a thickness of 2 mm is positioned and covered with a thin layer of PTFE powder (TF9205 3M/Dyneon, not irradiated, thermomechanically degraded, without functional groups and radicals). A 60 mm×60 mm steel plate is placed thereon. On this steel plate, another vulcanized NBR plate with dimensions of 50 mm×50 mm and a thickness of 2 mm is placed, whereon another 60 mm×60 mm steel plate is placed. This stack is positioned in a press with a punch diameter of 120 mm and pressurized with 100 kN at a temperature of 120° C. A vibrator is then positioned along the middle plate, with which vibrator this plate is induced to vibrate. After 20 minutes, the test is ended, the pressure is released, and the stack is removed. The TPU plate that was covered with TF9205 powder is removed and thoroughly washed with ethanol, with a light brushing thereby taking place using a paintbrush. After the drying of the plate, the surface feels like that of the starting material. The results are analogous to Comparative Example 1, which means that, with perfluoropolymer powder without functional groups and radicals, no surface modification took place under pressure, temperature and shearing, nor did any differences from the starting material emerge in terms of the sliding friction properties.

EXAMPLE 1

Analogously to Comparative Example 1, a dried TPU plate with dimensions of 50 mm×50 mm and a thickness of 2 mm is positioned on a 60 mm×60 mm steel plate and covered with a thin layer of PTFE-1 (reactivated PTFE powder Zonyl MP 1100 with —COCl groups). A 60 mm×60 mm steel plate is placed thereon. On this steel plate, a vulcanized NBR plate with dimensions of 50 mm×50 mm and a thickness of 2 mm is placed, whereon another 60 mm×60 mm steel plate is placed. This stack is positioned in a press with a punch diameter of 120 mm and pressurized with 100 kN at room temperature. A vibrator is then positioned along the middle plate, with which vibrator this plate is induced to vibrate. After 10 minutes, the pressure is released and the stack is removed. The TPU plate that was covered with PTFE-1 powder is removed and thoroughly washed with ethanol, with a light brushing thereby taking place using a paintbrush. After the drying of the plate, the treated surface visually differs from untreated plates. The treated surface feels very smooth and, in contrast to untreated TPU plates, the water drips off in this case.

PTFE particles are visible across the entire area in the REM image, and in the EDX image fluorine can be seen distributed very intensively and uniformly on the TPU surface. In the EDX spectrum, a marked fluorine peak is detectable, which means that a surface modification was achieved under pressure and vibration (shearing) even without temperature.

Tribological analyses in the block/ring test showed that no stick-slip phenomena emerge with these surface-modified TPU materials. Sliding friction coefficients between 0.22 and 0.28 were measured, which means that these surface-modified TPU materials markedly differ in terms of the sliding friction properties compared to the unmodified TPU starting material.

EXAMPLE 2

On a 100 mm×100 mm steel plate, a previously dried TPE-A/PEBA plate (Vestamid, Evonik) with dimensions of 50 mm×50 mm and a thickness of 2 mm is positioned and covered by a 100 mm×100 steel plate which at the center has a circular hole as a window with a diameter of 20 mm, such that the PEBA is only visible in the opening. The 2 steel plates with the PEBA sample are screwed together and once again dried in vacuum at 80° C. and fixed on a hot stage under a likewise dried PET film and heated to 80° C. On the visible/accessible PEBA in the window, PFA-1 powder (reactivated PFA powder with —COCl groups) is then added and rubbed in on the PEBA surface in a circular motion using a stiff brush. After 5 minutes, the test is stopped and the PEBA plate is removed. The PEBA plate that was locally covered with PTFE powder is suctioned and thoroughly washed with ethanol, with a light brushing thereby taking place using a paintbrush. After the drying of the plate, the locally treated surface visually differs from the untreated section. The treated surface feels very smooth and, in contrast to the untreated border zones, the water drips off the surface treated with PFA-1.

PFA particles are visible across the entire area in the REM image, and in the EDX image fluorine can be seen distributed intensively and uniformly on the PEBA surface. In the EDX spectrum of the locally treated surface, a marked fluorine peak is detectable, which means that a surface modification was achieved under pressure, temperature, and friction (shearing).

Tribological analyses in the block/ring test showed that no stick-slip phenomena emerge with these surface-modified PEBA materials. Sliding friction coefficients between 0.20 and 0.25 were measured, which means that these surface-modified PEBA materials markedly differ in terms of the sliding friction properties compared to the unmodified PEBA starting material.

EXAMPLE 3

On a 100 mm×100 mm steel plate, a pre-dried PA-6 plate with dimensions of 50 mm×50 mm and a thickness of 2 mm is positioned and covered by and screwed together with a 100 mm×100 mm steel plate which at the center has a circular hole as a window with a diameter of 20 mm, such that the PA6 is only visible in the opening. The 2 steel plates with the PA6 sample are once again dried in vacuum at 80° C. and fixed on a stage under a likewise dried PET film. After removal of the film, PTFE-2 micropowder (activated PTFE powder Algoflon L 620 with grafted acrylic acid chloride) and ceramic balls with a diameter of 0.3 mm are then added to the visible/accessible PA6 in the window. With a plastic punch (PET), the ceramic balls are moved on the surface in a rolling manner with the PTFE at room temperature under pressure and with a circular motion, such that the PA6 is treated with PTFE-2 micropowder on the accessible surface. After approx. 5 minutes, the test is stopped, the ceramic balls are removed, and the excess PTFE is suctioned away. The PA-6 plate is removed, and the site locally treated with PTFE-2 micropowder is thoroughly washed with ethanol, with a light brushing thereby taking place using a paintbrush. After the drying of the plate, the locally treated surface visually differs from the untreated section. The treated surface feels smooth and, in contrast to the untreated border zones, the water drips off in this case.

PTFE particles are visible across the entire area in the REM image, and in the EDX image fluorine can be seen distributed intensively and uniformly on the PA6 surface. In the EDX spectrum of the locally treated surface, a marked fluorine peak is detectable, which means that a surface modification was achieved under pressure and friction (shearing) at room temperature.

Tribological analyses in the block/ring test showed that no stick-slip phenomena emerge with these surface-modified PA6 materials. Sliding friction coefficients between 0.19 and 0.21 and wear coefficients of 3.2 to 6.9 $10^{-7}$ mm$^3$/Nm were measured, which means that these surface-modified PA6 materials markedly differ in terms of the sliding friction and wear properties compared to the unmodified PA6 starting material.

EXAMPLE 4

On a 100 mm×100 mm steel plate, a pre-dried PA66/GF30 plate with dimensions of 50 mm×50 mm and a thickness of 2 mm is positioned and covered by and screwed together with a 100 mm×100 steel plate which at the center has a circular hole as a window with a diameter of 20 mm, such that the PA66/GF30 is only visible in the opening. The 2 steel plates with the PA66/GF30 sample are once again dried in vacuum at 80° C. and fixed on a stage under a likewise dried PET film. After removal of the film, the PTFE-3 (reactivated PTFE powder Zonyl MP 1100 with —COCl groups in PAO-8) is then thinly applied as a paste-like mass to the visible/accessible PA66/GF30 in the window. Using a sonotrode, the PTFE-3 paste on the PA66/GF30 surface is subjected to an ultrasound treatment with short pulses under light pressure and with a slowly circular motion. After approx. 4 minutes, the test is stopped. The PA66/GF30 plate that was locally treated with PTFE-3 paste is first thoroughly washed with naphtha and then with ethanol, with a light brushing thereby taking place using a paintbrush. After the drying of the plate, the locally treated surface visually differs from the untreated section. The treated surface feels very smooth and, in contrast to the untreated border zones, the water drips off in this case.

PTFE particles are visible across the entire area in the REM image, and in the EDX image fluorine can be seen distributed intensively and uniformly on the locally treated PA66/GF30 surface. In the EDX spectrum of the locally treated surface, a marked fluorine peak is detectable, which means that a surface modification was achieved under pressure and with ultrasound treatment.

Tribological analyses in the block/ring test showed that no stick-slip phenomena emerge with these surface-modified PA66/GF30 materials. Sliding friction coefficients between 0.18 and 0.20 and wear coefficients of 0.25 to 3.9·$10^{-7}$ mm$^3$/Nm were measured, which means that these surface-modified PA66/GF30 materials markedly differ in terms of the sliding friction and wear properties compared to the unmodified PA66/GF30 starting material.

EXAMPLE 5

An 80 mm×80 mm epoxy resin/glass fabric pre-preg single plate is on one side [surface A] briefly treated with an aqueous 0.5% polyethylenimine solution (PEI=polyethylenimine, Aldrich, $M_n$=10,000), which is subsequently rinsed away with copious distilled water. The verification and the uniformity of the PEI coupling on the surface A can easily be checked via staining with the dye eosin, whereby the modified side is also marked as surface A. The epoxy resin/glass fabric pre-preg single plate modified on one side with PEI is then dried.

On a 100 mm×100 mm steel plate, the 80 mm×80 mm pre-dried epoxy resin/glass fabric pre-preg single plate surface-modified with PEI is positioned such that the modified surface A is on top, and is covered by and screwed together with a 100 mm×100 mm steel plate which at the center has a circular hole as a window with a diameter of 50 mm, such that the epoxy resin/glass fabric pre-preg single plate with the surface A is only visible in the opening. The 2 steel plates with the epoxy resin/glass fabric pre-preg single plate are once again dried in vacuum at 80° C. and are fixed on a stage under a likewise dried PET film. The PFA-2 powder (PFA powder—activated with grafted acrylic acid chloride and additionally reactivated with perfluoroalkyl —COCl groups) is added to the visible part of this dried surface A modified with amino groups. In the opening, the surface A with the PFA-2 powder is treated by a brushing using a stiff brush. The excess loose PFA-2 powder is then suctioned away. With 9 additional 80 mm×80 mm epoxy resin/glass fabric pre-preg single plates, this surface-modified epoxy resin/glass fabric pre-preg single plate is pressed such that it is on top with the colored side visibly facing upwards in the stack between 2 PTFE films in a press mold for 30 minutes at 160° C. to form a composite plate. After the cooling, the surface A is thoroughly washed with ethanol, with a light brushing thereby taking place with a paint brush. After the drying of the composite plate, the section of the treated surface A feels very smooth and, in contrast to the untreated surfaces, the water drips off in this case.

PFA particles are visible across the entire area in the REM image, and in the EDX image fluorine can be seen distributed intensively and uniformly on the treated surface A of the composite plate. In the EDX spectrum of the surface A, a marked fluorine peak is detectable, which means that a surface modification was achieved.

Tribological analysis in the block/ring test showed that, in contrast to untreated surfaces, no stick-slip phenomena emerge for sample bodies with the surface-modified side (surface A) of the composite plate. Sliding friction coefficients between 0.21 and 0.23 and wear coefficients of 1.5 to 5.3·$10^{-7}$ mm$^3$/Nm were measured, which means that the surface-modified side (surface A) of composite plates, which can be further processed into sliding blocks by machining for example, markedly differ in terms of the sliding friction and wear properties compared to the unmodified plate material.

The invention claimed is:

1. A plastic body comprising a plastic, the plastic body having a modified surface, wherein the plastic comprises a reactive group comprising at least one of —OH and —NH, wherein the reactive groups comprising at least one of —OH and —NH at the surface of the plastic body are covalently coupled with a modified perfluoropolymer (micro)powder; wherein the modified perfluoropolymer (micro)powder comprises particles comprising a perfluoropolymer that have been modified prior to said covalent coupling, at least at a surface-proximate region of the particles, to include at least one of a reactive carboxylic acid halide, a (meth)acrylic halide that has been grafted via a perfluoropolymer (peroxy) radical, and (meth)acrylic acid halide converted from a (meth)acrylic acid; wherein the surface of the plastic body is modified by reactive conversion of the reactive groups with the modified perfluoropolymer under mechanical stress at room temperature; wherein the surface of the plastic body is locally or at least partially covalently coupled with the modified perfluoropolymer (micro)powder.

2. The plastic body of claim 1 in which the plastic body is a molded part and/or a component part.

3. The plastic body of claim 1, wherein the plastic comprises a polyamide, a polyester amide, a polyether amide, a polyether ester amide, a polyamide amine, a polyamide imide, a polyurethanes, a polyurethane urea, a polyether urea, a polyether amide urea, a polyester urea, a polyester amide urea, a polyether ester urea, a polyether ester amide urea, each with (a) —NH₂ amino groups and/or —NHR amino groups, wherein R=alkyl, alkylaryl and aryl, and/or (b) —NH₂ and/or —NHR* amide groups, wherein R*=alkyl and alkylaryl, and/or (c) —OH groups.

4. The plastic body of claim 3 wherein the plastic comprising the reactive —NH groups and/or —OH groups comprises at least one of:
  aliphatic and/or partially aromatic polyamides and mixtures/blends thereof and/or mixtures/blends with other polymers;
  PUR casting resins;
  TPU (thermoplastic polyurethanes) and TPU mixtures/blends and mixtures/blends with other polymers;
  thermoplastic polyester amides and/or polyether amides and/or polyether ester amides (PEBA) with aliphatically substituted —NH groups and mixtures/blends thereof and mixtures/blends with other polymers;
  thermosets and specifically fiber-reinforced thermosets such as for example BMC (bulk molding compound) or SMC (sheet molding compound) as a pre-preg and/or cured material, advantageously on an epoxy resin base without or with a subsequent modification at the surface, for example, with ammonia and/or (poly)amine;
  polymers or polymer mixtures/blends which, in addition to the reactive —NH groups and/or —OH groups, also have olefinically unsaturated double bonds that are additionally further modified at the surface by a modification reaction, advantageously by chlorohydrin formation or epoxidation and possibly then also in a further reaction with ammonia and/or (poly)amine;
  polymers or polymer mixture/blends which have olefinically unsaturated double bonds that are further modified at the surface by a modification reaction, advantageously by chlorohydrin formation or epoxidation and possibly then also in a reaction with ammonia and/or amine;
  and combinations of one or more thereof.

5. The plastic body of claim 1 in which the modified perfluoropolymer (micro)powder has been modified by radiation-chemical and/or plasma-chemical treatment.

6. The plastic body of claim 1 wherein the modified perfluoropolymer (micro)powder comprises one or more of PTFE, PFA and FEP.

7. The plastic body of claim 1 wherein the one or more of PTFE, PFA and FEP has been modified by radiation-chemical and/or plasma-chemical treatment.

8. The plastic body of claim 1 wherein the modified perfluoropolymer (micro)powder comprises perfluoropolymer carboxylic acid chloride as perfluoropolymer carboxylic acid halide and (meth)acrylic acid chloride as radically grafted (meth)acrylic acid halide.

9. The plastic body of claim 1 wherein the surface of the plastic body is essentially completely, or completely, covalently coupled with the modified perfluoropolymer (micro)powder.

10. The plastic body of claim 1 in which the modified perfluoropolymer (micro)powder has particle sizes in the range of 60 nm to 500 μm.

11. The plastic body of claim 10 in which the modified perfluoropolymer (micro)powder has particle sizes in the range of 200 nm to 5 μm.

12. A method for producing modified plastic surfaces with the perfluoropolymer (micro)powders of claim 1, in which method modified perfluoropolymer (micro)powders which at least in the surface-proximate region of the modified perfluoropolymer (micro)powder particles comprise reactive carboxylic acid halide and/or comprise (meth)acrylic acid halide grafted via perfluoropolymer (peroxy) radicals of the perfluoropolymer (micro)powders are applied at room temperature to a solid surface of plastics which at least at the surface comprise reactive —NH groups and/or —OH groups, and a reactive conversion under mechanical stress is carried out during and/or after the application of the modified perfluoropolymer (micro)powders.

13. The method according to claim 12 in which, for the grafting of the modified perfluoropolymer (micro)powders via perfluoropolymer (peroxy) radicals, (meth)acrylic acid monomers are added which are modified into (meth)acrylic acid halide after the grafting reaction and before the reactive conversion.

14. The method according to claim 12 in which modified perfluoropolymer (micro)powders, modified PTFE powder and/or PFA powder and/or FEP powder, advantageously PTFE powder and/or PFA powder and/or FEP powder modified by means of radiation-chemical and or plasma-chemical treatment, are used.

15. The method according to claim 12 in which radiation-chemically modified perfluoropolymer (micro)powders are used which have been modified with a radiation dose of >50 kGy and preferably ≥100 kGy.

16. The method according to claim 12 in which modified perfluoropolymer (micro)powders are used which have been radiation-chemically modified in the presence of reactants and preferably with exposure to oxygen.

17. The method according to claim 12 in which modified perfluoropolymer (micro)powders with perfluoropolymer carboxylic acid chloride are used as perfluoropolymer carboxylic acid halide and (meth)acrylic acid chloride is used as radically grafted (meth)acrylic acid halide.

18. The method according to claim 12 in which modified perfluoropolymer (micro)powders are used which have carboxylic acid halide groups and preferably carboxylic acid chloride groups, at concentrations of at least 5 mmol/kg of perfluoropolymer and preferably >30 mmol/kg.

19. The method according to claim 12 in which polymeric compounds with reactive —NH groups and/or —OH groups are used as plastics, and the compounds can be alkylated and/or acylated at the —NH group.

20. The method according to claim 12 in which polymeric compounds with reactive —NH groups and/or —OH groups are used as plastics, which compounds are advantageously polyamides, polyester amides, polyether amides, polyether ester amides, polyamide amines, polyamide imides, polyurethanes, polyurethane ureas, polyether ureas, polyether amide ureas, polyester ureas, polyester amide ureas, polyether ester ureas, polyether ester amide ureas, each with —NH₂ amino groups and/or —NHR amino groups (with R=alkyl, alkylaryl and aryl) and/or —NH₂ and/or —NHR* amide groups (with R*=alkyl and alkylaryl) and/or —OH groups and are mixtures thereof or with other polymers.

21. The method according to claim 12 in which the modified perfluoropolymer (micro)powders are applied to the plastic surface at room temperature, preferably at 18 to 25° C.

22. The method according to claim 12 in which modified perfluoropolymer (micro)powders are applied to a solid plastic surface which has a temperature of up to 200° C., preferably up to 150° C.

23. The method according to claim 12 in which the reactive conversion is achieved under mechanical stress via compressive stress, such as rubbing and/or brushing and/or ultrasound without or with carrier bodies composed of metal and/or ceramic and/or plastic, and/or via stressing by accelerated carrier bodies composed of metal and/or ceramic and/or plastic, wherein the mechanical stress is applied during and/or after the application of the radiation-chemically and/or plasma-chemically modified perfluoropolymer (micro)powders to the solid plastic surface.

24. The method according to claim 12 in which the application of the modified perfluoropolymer (micro)powders is carried out before the reactive conversion under mechanical stress and the modified perfluoropolymer (micro)powder is positioned on the solid plastic surface via electrostatic adsorption.

* * * * *